United States Patent [19]

Lukich et al.

[11] Patent Number: 5,704,999
[45] Date of Patent: Jan. 6, 1998

[54] PNEUMATIC TIRE WITH RUBBER WEAR INDICATOR BETWEEN CARCASS PLIES

[75] Inventors: Lewis Timothy Lukich, Akron; Raymond Benjamin Roennau, Stow; Paul Harry Sandstrom, Tallmadge, all of Ohio

[73] Assignee: The Goodyear Tire & Rubber Company, Akron, Ohio

[21] Appl. No.: 726,120

[22] Filed: Oct. 4, 1996

[51] Int. Cl.⁶ .................. B60C 1/00; B60C 9/00; B60C 9/02; B60C 11/24
[52] U.S. Cl. .................. 152/154.2; 152/548; 152/564
[58] Field of Search .................. 152/154.2, 549, 152/564, 548

[56] References Cited

U.S. PATENT DOCUMENTS

| | | | |
|---|---|---|---|
| 3,261,388 | 7/1966 | Kovac et al. | 152/154.2 |
| 3,814,160 | 6/1974 | Creasey | 152/154.2 |

Primary Examiner—Adrienne C. Johnstone
Attorney, Agent, or Firm—Marc R. Dion, Sr.

[57] ABSTRACT

A wear indicator strip for a pneumatic tire having a multiply carcass, such as a military aircraft tire, is located preferably between the two radially outermost carcass plies. The wear indicator strip is of a contrasting color and comprises and elastomeric compound of natural or polyisoprene rubber reinforced with silica.

4 Claims, 2 Drawing Sheets

PNEUMATIC TIRE WITH RUBBER WEAR INDICATOR BETWEEN CARCASS PLIES

FIELD OF THE INVENTION

This invention relates to pneumatic tires and more particularly, to the use of a wear indicator strip in such tires.

BACKGROUND

The use of treadwear indicators is not new. See, for instance, U.S. Pat. No. 3,814,160 and art cited therein. The basic concepts set forth in that art is to provide a visual indicator of when the tread and belts, if used, have worn down to the point that the tire should be retreaded. The '160 patent places a layer of rubber having a contrasting color between the belts and the tread. U.S. Pat. No. 3,261,388 uses a filamentary synthetic textile material which has been dyed a contrasting color between the outermost carcass ply and the belt plies.

In those circumstances where it is customary to scrap a tire rather than retread it, it is not necessary to locate the wear indicator between the carcass and the belts or between the belts and the tread or between the belts.

It has been found that in tires having multiply carcasses to provide sufficient carcass strength for their intended application that a wear indicator can be located between the outer carcass plies. This provides for a longer wearing tire since its only upon the failure of the outer carcass ply that the tire loses its integrity necessitating its being scrapped.

SUMMARY OF THE INVENTION

In accordance with the practice of the present invention, there is provided a pneumatic tire comprising a multiply carcass terminating in spaced bead cores, a tread secured to the carcass, belt plies between the carcass and tread, the improvement wherein an elastomeric wear indicator strip of a contrasting color is inserted within the carcass plies. The contrasting color of the wear indicator strip is provided by a silica reinforced elastomer.

DETAILED DESCRIPTION OF THE INVENTION

Figure 1:
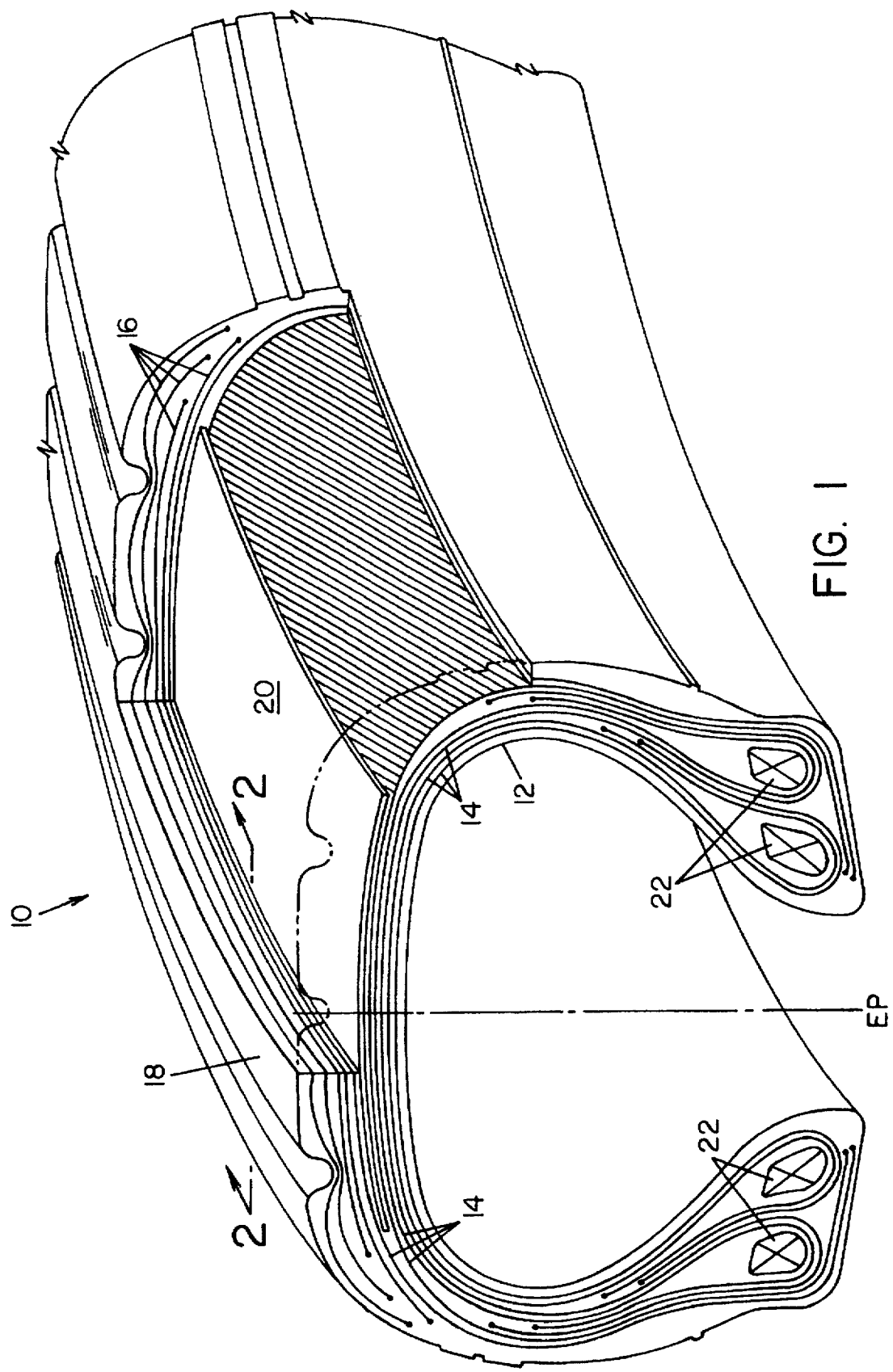
FIG. 1 is a perspective view of a section of a tire of the present invention with portions cut away to better illustrate the construction.
Figure 2:
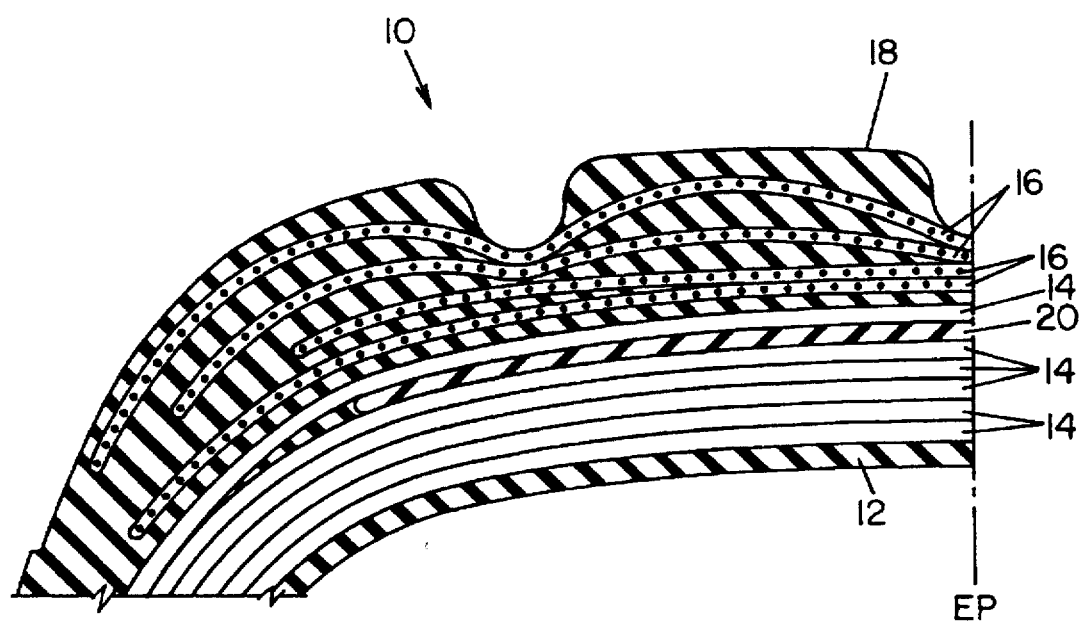
FIG. 2 is a partial cross-sectional view taken along line 2—2 of FIG. 1.

The tire (10) is preferably a military aircraft tire and is comprised of an innerliner (12), a plurality of carcass plies (14) which wrap around and secure spaced bead cores (22), a tread (18) secured to the carcass plies (14) with at least one belt ply (16) between the carcass plies (14) and the tread (18). The improvement is provided by a wear indicator strip (20) which is located within the carcass plies (14), preferably between the last two plies located radially outward from the axis of the tire. The wear indicator strip (20) is made from an elastomeric compound providing a contrasting color.

The preferred elastomeric compound for the wear indicator strip (20) is a natural rubber or synthetic polyisoprene rubber reinforced with silica. Per 100 parts by weight of the rubber, the elastomeric compound can contain from 25 to 55 parts of silica, a silica coupler such as an organosilane at a ratio of coupler to silica of from 1:5 to 1:15. Representative of, but not limiting the organosilanes of the invention, are the following compounds:

cis-2-butenyltriethoxysilane,
2,6-octadienyltriethoxysilane,
[2-(3-cyclohexenyl)-ethyl]triethoxysilane,
tris(2-methoxyethoxy)vinylsilane,
bis-(3-[triethoxysilyl]-propyl)-disulfide,
3-(triethoxysilyl)-1-propanamine,
chloropropyltriethoxysilane.

Preferred are bis-(3-[triethoxysilyl]-propyl)tetrasulfide, bis-3-[triethoxysilyl]-propyl)-disulfide and chloropropyltriethoxysilane. Most preferred is bis-(3-[triethoxysilyl]-propyl)-tetrasulfide.

Also useful in the compounds per 100 parts by weight of the rubber are processing oil at 1 to 20 parts, stearic acid at 0.5 to 5.0 parts, 0.5 to 10 parts of a plasticizer such as a methyl ester of hydrogenated wood rosin, e.g. Hercolyn D® from Hercules, 0.2 to 3.0 parts of a heat reactive bromomethyl alkylated phenolic resin, 3 to 10 parts of zinc oxide and various non-staining antioxidants, accelerators and curatives, particularly useful to adjust the rate of the cure package is the use of 0.5 to 4.0 parts of N,N'-m-phenylenedimaleimide, DuPont HVA-2.

The color of the elastomeric compound for the wear indicator strip is typically straw, but any number of dyes can be added to change the contrasting color to e.g. yellow, red, blue, white, etc. The compounded wear indicator strip should have a width sufficient to cover the crown area of the tire and be inserted during the construction of the tire between the second to the last carcass ply and the last carcass ply located radially outward from the axis of the tire.

The wear of a tire through the tread and any belt plies it may have and any portion of the outer carcass ply to expose the contrasting color of the wear indicator strip is an indication that the tire should be replaced.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a multiply carcass terminating in spaced bead cores, a tread secured to said carcass, belt plies between said carcass and tread, the improvement wherein an elastomeric wear indicator strip of a contrasting color is inserted within the carcass plies.

2. The tire of claim 1 wherein the wear strip of a contrasting color is a silica reinforced elastomer.

3. The tire of claim 1 wherein the wear indicator strip is located between the two radially outermost carcass plies.

4. The tire according to claim 1 wherein the wear indicator is comprised of an elastomeric compound comprising: 100 parts by weight of natural or synthetic polyisoprene rubber; 25 to 55 phr of silica; an organosilane coupling agent at a ratio of coupler to silica of 1:5 to 1:15 parts; 1 to 20 phr of a processing oil; 0.5 to 5 phr stearic acid; 0.5 to 10 phr of a methyl ester of hydrogenated wood rosin; 0.2 to 3.0 phr of a heat reactive bromomethyl alkylated phenolic resin; 3 to 10 phr of zinc oxide; optionally various non-staining antioxidants, accelerators, and curatives; and 0.5 to 4.0 phr of N,N'-m-phenylenedimaleimide.

* * * * *